(12) United States Patent
Thatavarthy et al.

(10) Patent No.: US 9,779,146 B2
(45) Date of Patent: Oct. 3, 2017

(54) GRAPHICAL USER INTERFACE FOR A DATA RECORD MATCHING APPLICATION

(71) Applicants: Prasanthi Thatavarthy, La Crosse, WI (US); Jeffrey Woody, Onalaska, WI (US); Ronald Dupey, West Salem, WI (US)

(72) Inventors: Prasanthi Thatavarthy, La Crosse, WI (US); Jeffrey Woody, Onalaska, WI (US); Ronald Dupey, West Salem, WI (US)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 14/175,161

(22) Filed: Feb. 7, 2014

(65) Prior Publication Data
US 2015/0227542 A1 Aug. 13, 2015

(51) Int. Cl.
*G06F 17/30* (2006.01)
(52) U.S. Cl.
CPC .. *G06F 17/30554* (2013.01); *G06F 17/30126* (2013.01); *G06F 17/30386* (2013.01)
(58) Field of Classification Search
CPC ......... G06F 17/30315; G06F 17/30442; G06F 17/30126
USPC ........................................ 707/999
See application file for complete search history.

(56) References Cited

U.S. PATENT DOCUMENTS

| | | | | |
|---|---|---|---|---|
| 6,389,429 B1* | 5/2002 | Kane | ................ | G06F 17/30289 707/748 |
| 2002/0026435 A1* | 2/2002 | Wyss | ................ | G06F 17/30722 707/999.001 |
| 2003/0046280 A1* | 3/2003 | Rotter | ................... | G06F 19/322 707/999.006 |
| 2003/0120652 A1* | 6/2003 | Tifft | ................. | G06F 17/30442 707/999.006 |
| 2008/0062318 A1* | 3/2008 | Ellis | ................... | H04N 5/44543 348/564 |
| 2009/0193046 A1* | 7/2009 | Desai | ................ | G06F 17/30315 707/999.101 |
| 2012/0060216 A1* | 3/2012 | Chaudhri | ............... | G06Q 10/10 726/21 |
| 2012/0278349 A1* | 11/2012 | Bidlack | ............. | G06F 17/30489 707/758 |

(Continued)

*Primary Examiner* — Ashish K Thomas
*Assistant Examiner* — Jedidiah Ferrer
(74) *Attorney, Agent, or Firm* — Mintz Levin Cohn Ferris Glovsky and Popeo, P.C.

(57) ABSTRACT

The subject matter disclosed herein provides methods for identifying duplicate data records using a graphical user interface. One or more data records may be accessed from one or more source files. The data records may have one or more data fields associated with one or more data types. One or more match themes may be proposed based on the data types. The match themes may have one or more rules for identifying duplicate data records. A selection of a match theme and at least one rule associated with the selected match theme may be received. The data records may be processed using the selected match theme and rules to identify the duplicate data records. A graphical user interface previewing the duplicate data records may be displayed. The duplicate data records may be organized into match groups. Related apparatus, systems, techniques, and articles are also described.

18 Claims, 6 Drawing Sheets

(56) References Cited

U.S. PATENT DOCUMENTS

| | | | |
|---|---|---|---|
| 2013/0124525 A1* | 5/2013 | Anderson | G06F 17/30286 707/737 |
| 2013/0339150 A1* | 12/2013 | Williams | G06Q 30/0273 705/14.54 |
| 2015/0006491 A1* | 1/2015 | He | G06F 17/30575 707/694 |
| 2015/0227542 A1* | 8/2015 | Thatavarthy | G06F 17/30156 707/692 |

* cited by examiner

| | Person | Firm | ID | Country | Address | City | Region | Postal Code | E-Mail | Phone |
|---|---|---|---|---|---|---|---|---|---|---|
| | 205A | 205B | 205C | 205C | 205D | 205E | 205F | 205G | 205H | 205I |
| 205 | Liz Crutcher | Crossroads Consulting | 216 | US | 100 Main St. | Nashville | TN | 37218 | | 918-590-6247 |
| 210 | Kimberly Fernandez | Planview Inc. | | | 14 E 50th St., Suite 1003 | New York | NY | 10022 | | 212-755-0550 |
| 215 | Liz Crutcher | Crossroads Consulting | | US | 100 Main St., Apt. 4 | Nashville | TN | 37218 | help4you@crossroads.com | |
| 220 | Joseph Ward | Smith & Harris Machine | | US | 321 Larkin St. | Madison | WI | 53705 | | |
| 225 | John Smith | ABC Construction | 1459 | US | 1028 Century Blvd. | Seattle | WA | 98115 | jsmith@abcconstruction.com | |
| 230 | Joseph Ward | S&H Machine | 577 | US | 321 Larkin St. | Madison | WI | 53705 | | 608-887-5253 |
| 235 | John Smith | Landmark Entertainment | | US | 1028 Century Blvd. | Los Angeles | CA | 90012 | | 310-525-1863 |
| 240 | Joe Ward | | | | | | | | | |
| 245 | John Smith | Apex Marketing | | | 555 W. 5th St. | Los Angeles | CA | 90012 | | 608-887-5253 |
| 250 | Bill Crutcher | | | | 4835 Trumpet Circle | Nashville | TN | 37218 | | 310-525-1863 |
| 255 | William Crutcher | | | | 4835 Trumpet Circle | Nashville | TN | 37218 | | |

Preview of New Match Results — Apply 405 — Cancel 410

| Match Group | Change Indicator | Person | Firm | ID | Country | Address | City | Region | Postal Code | E-Mail | Phone |
|---|---|---|---|---|---|---|---|---|---|---|---|
| 1 | ▓ | Joseph Ward | Smith & Harris Machine | | US | 321 Larkin St. | Madison | WI | 53705 | | |
| | ▓ | Joseph Ward | S&H Machine | 577 | US | 321 Larkin St. | Madison | WI | 53705 | | 608-887-5253 |
| | ▓ | Joe Ward | | | | | | | | | 608-887-5253 |

430 — Person

Match strictness for person data:

Looser — Default — Tighter — 435

FIG. 4C

Preview of New Match Results — Apply 405 — Cancel 410

| Match Group | Change Indicator | Person | Firm | ID | Country | Address | City | Region | Postal Code | E-Mail | Phone |
|---|---|---|---|---|---|---|---|---|---|---|---|
| 1 | | Joseph Ward | Smith & Harris Machine | | US | 321 Larkin St. | Madison | WI | 53705 | | |
| | | Joseph Ward | S&H Machine | 577 | US | 321 Larkin St. | Madison | WI | 53705 | | 608-887-5253 |
| | ▓ | ~~Joe Ward~~ | | | | | | | | | ~~608-887-5253~~ |

440, 445 — 225, 235, 245

Address

Match strictness for address data:

Looser — Default — Tighter

⟩⟩ Advanced options

Address matching options:

☑ 100 Main St. = 100 Main St., Apt. X —— 457
☑ 100 Main St = 100 Main
☑ 100 Main St = 100 Main Ave
☑ 100 Main St = 100 N Main St
☑ 100 S Main St = 100 N Main St 450 {brace around Address section}
455 {brace around Advanced options section}

FIG. 4D

[ Apply 405 ]  [ Cancel 410 ]

Preview of New Match Results

| Match Group | Change Indicator | Person | Firm | ID | Country | Address | City | Region | Postal Code | E-Mail | Phone |
|---|---|---|---|---|---|---|---|---|---|---|---|
| 1 | | Joseph Ward | Smith & Harris Machine | | US | 321 Larkin St. | Madison | WI | 53705 | | |
| | | Joseph Ward | S&H Machine | 577 | US | 321 Larkin St. | Madison | WI | 53705 | | 608-887-5253 |
| 2 | ▓ | Liz Crucher | Crossroads Consulting | | US | 100 Main St. | Nashville | TN | 37218 | | 918-590-6247 |
| | ▓ | Liz Crucher | Crossroads Consulting | | US | 100 Main St., Apt. 4 | Nashville | TN | 37218 | help4you@crossroads.com | |

GRAPHICAL USER INTERFACE FOR A DATA RECORD MATCHING APPLICATION

TECHNICAL FIELD

This disclosure relates generally to the elimination of duplicate data records from one or more source files using a computer application having a user friendly graphical user interface.

BACKGROUND

Businesses of every size manipulate large amounts of data records every day. These data records include important information for day-to-day operations including, for example, customer accounts, employee information, marketing campaigns, and the like. It is not uncommon for many data records to be unintentionally duplicated many times over. While match software applications have been developed to find and eliminate these duplicate data records, these applications are often cumbersome to use and require a specialized knowledge of the data being reconciled.

SUMMARY

In some implementations, methods and apparatus, including computer program products, are provided for identifying duplicate data records using a graphical user interface.

In one aspect, one or more data records are accessed from one or more source files. The one or more data records have one or more data fields associated with one or more data types. One or more match themes are proposed based on the one or more data types. The one or more match themes have one or more rules for identifying one or more duplicate data records from the one or more data records. A selection of a match theme and at least one rule associated with the selected match theme are received. The one or more data records are processed using the selected match theme and the at least one rule to identify the one or more duplicate data records. A graphical user interface previewing the one or more duplicate data records is displayed. The one or more duplicate data records are organized into one or more match groups. The accessing, the proposing, the receiving, the processing, and the displaying are performed by at least one processor.

The above methods, apparatus, and computer program products may, in some implementations, further include one or more of the following features.

The graphical user interface may further display one or more change indicators identifying a change to one or more duplicate data records in the at least one match group. The change to the one or more duplicate data records may include one or more of a removal of a duplicate data record from the at least one match group and an addition of a new duplicate data record to the at least one match group. The graphical user interface may further display a message identifying the change in a floating window when a user hovers over the change indicator. The message may further identify a status of the removed duplicate data record. The status may include one or more of a transfer of the removed duplicate data record to a new match group and a failure of the removed duplicate record to match with any of the one or more match groups.

The graphical user interface may further display one or more statistics relating to the one or more data records before the displaying of the graphical user interface. The one or more statistics may include one or more of the following: a first quantity representing a number of the match groups after the processing, a second quantity representing a number of changes to the match groups after the processing, and a list of changes to the match groups based on the processing.

The graphical user interface may further display one or more tools for adjusting the processing of the one or more data records. The one or more tools may include at least one or more sliders for adjusting a match strictness of the at least one rule by tightening or relaxing one or more options associated with the at least one rule, and a list of one or more advanced matching options defining additional match conditions. The one or more advanced matching options may be based on the one or more data types.

The match group may include two or more data records satisfying one or more of the following conditions: the two or more data records may have identical data values in each of the data types associated with the selected match theme and the at least one rule; the two or more data records may be a near match; the two or more data records may be a suspect match; and the two more data records may be a conflicting match.

The graphical user interface may further display one or more review indicators associated with the one or more match groups. The one or more review indicators may flag the near match, the suspect match, or the conflicting match.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF DRAWINGS

The accompanying drawings, which are incorporated herein and constitute a part of this specification, show certain aspects of the subject matter disclosed herein and, together with the description, help explain some of the principles associated with the subject matter disclosed herein. In the drawings.

FIG. 2 illustrates a table of sample data records, in accordance with some example implementations;

FIGS. 3A and 3B illustrate graphical user interfaces for selecting a match theme and match rules in the data record matching application, in accordance with some example implementations;

FIGS. 4A, 4B, 4C, 4D, and 4E illustrate graphical user interfaces for operating the data record matching application, in accordance with some example implementations.

Like reference symbols in the various drawings indicate like elements.

DETAILED DESCRIPTION

This application discloses techniques for reducing the number of duplicate data records collected from one or more source files using a data record matching application. Unlike conventional matching applications which may require a substantial amount of manual input and an intimate familiarity with the data being processed, the application and graphical user interface disclosed herein may abstract these details from the user to automate the match process using match themes and rules. Duplicate data records may be displayed in match groups and tagged with various visual elements or icons to indicate that a particular data record warrants a closer look.

Figure 1:
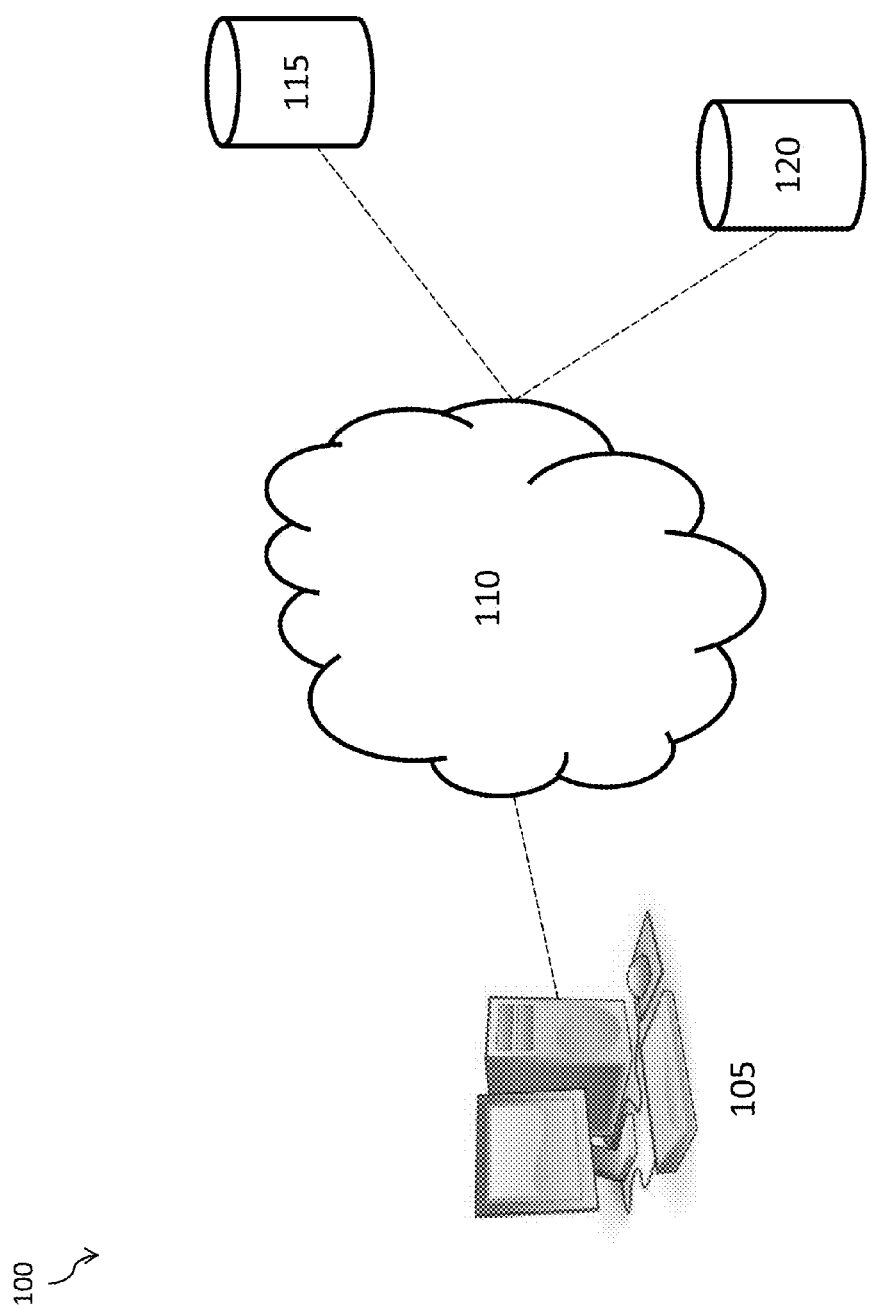
FIG. 1 illustrates a system for using a data record matching application, in accordance with some example implementations.

FIG. 1 illustrates an exemplary system 100 for using the data record matching application. System 100 may include a computing device 105, such as a computer or a laptop, operated by a data steward. The data steward may be responsible for collecting, consolidating, and reconciling data records from databases 115 and 120. Databases 115 and 120 may store different types of data including, for example, data records related to a firm's customer relationship management (CRM) system or human capital management (HCM) system. In some implementations, these databases may be remotely accessed via network 110. Databases 115 and 120 may send one or more source files containing data records to computer 105. These source files may be sent on a regular basis (e.g., weekly reports) or upon request from computing device 105. The data steward can run a data record matching application on computing device 105 to consolidate the data records from the source files and process these data records to eliminate duplicates.

FIG. 2 illustrates a table 200 of sample data records. Data record 205 may include data fields 205A-205I. Each of these data fields may hold data values associated with a data type. For example, data field 205A may hold a name (i.e., a data value) associated with a person (i.e., a data type). Likewise, data field 205B may hold a name (i.e., a data value) associated with a firm (i.e., a data type). As illustrated in FIG. 2, each column of table 200 may be associated with a particular data type. Computing device 105 may run a data record matching application to identify duplicates from data records 210-265. Duplicate data records may be data records that represent the same entity (e.g., individual or corporation).

The data record matching application may use a match theme to process data records 210-265. A match theme may represent a strategy for identifying duplicate data records. The data record matching application may propose a match theme based on the type of data included in the data records. For example, if the data records received from databases 115 and 120 contain personal information for various individuals, then the data record matching application may propose an "Individual" match theme to process the data records. If, however, the data records contain company information for various firms, then the data record matching application may propose a "Corporate" match theme instead. If the data records contain ID information (e.g., social security number, employee personnel number, and the like), then the data record matching application may propose an "ID" match theme. In some implementations, various combinations of match themes may be used to process data records 210-265 including, for example, an "Individual and Corporate" theme if personal information and firm information are found in the data records.

Figures 3A, 3B:
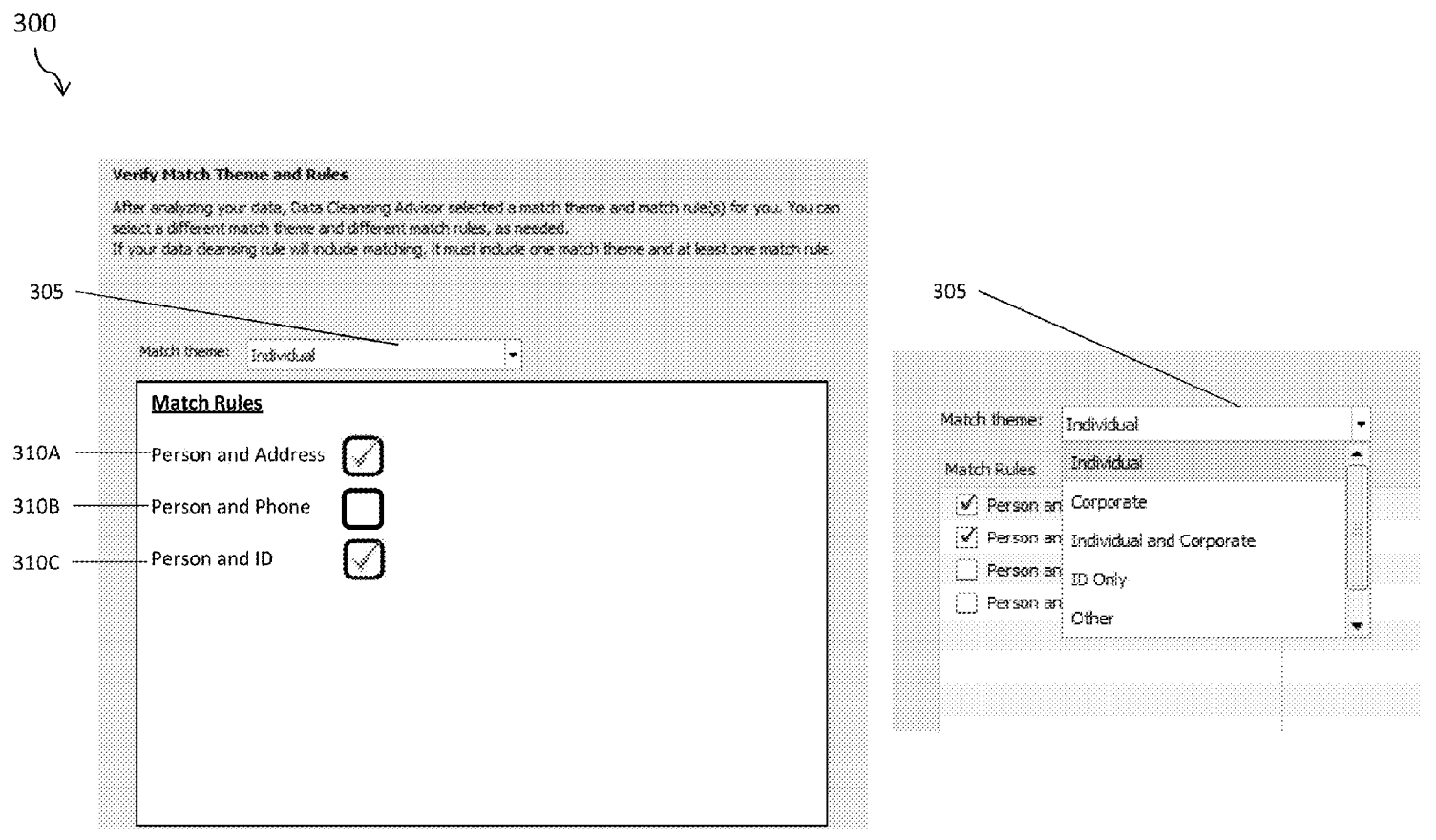

The data record matching application may cause computer 105 to display graphical user interface 300 of FIG. 3A to propose one or more match themes to the data steward. The proposed match themes may appear in drop-down box 305. Continuing with the example of table 200, data records 210-265 include personal information associated with individuals (e.g., a person's name), company information associated with firms (e.g., a company's name), and ID values. Accordingly, the data record matching application may propose an "Individual" match theme, a "Corporate" match theme, an "ID" match theme, or various combinations of these themes as illustrated in FIG. 3B. In the example of FIG. 3A, the data steward has selected an "Individual" match theme.

Each match theme may be associated with one or more match rules which may be used to find duplicate data records. These match rules may correspond to the data types present in the data records and may be automatically proposed by the data record matching application based on the selected match theme. For example, if an "Individual" match theme is selected, then the data record matching application may propose one or more data types commonly associated with individuals as possible match rules including, for example, the individual's ID information, address, phone number, e-mail address, and the like. In the implementation of FIG. 3A, the data record matching application may propose a "Person and Address" rule 310A, a "Person and Phone" rule 310B, and a "Person and ID" rule 310C because person, address, phone, and ID data values are present in data records 210-265. The data record matching application may not propose an "E-Mail" rule, for example, because e-mail addresses are absent from data records 210-265. While data records 210-265 also include data values for the country, city, region, and postal code data types, match rules may not be proposed using these data types given their general applicability. For example, adding a country rule may not being a meaningful match constraint if most of the individuals reside in the same country as shown in data records 210-265. However, if the data record matching application determines that a sufficient number of countries, cities, regions, and postal codes are represented in the data records (e.g., beyond a predetermined threshold value), then rules may be automatically proposed for these data types. The data steward may select one or more rules by checking the box next to the desired rule.

The data record matching application may process the data records in table 200 in accordance with the selected match theme and rules. In the implementation of FIG. 3A, an "Individual" match theme, a "Person and Address" rule, and a "Person and ID" rule may be selected. Based on these selections, the data record matching application may find duplicate data records if two or more data records have the same person and address values or the same person and ID values. The data record matching application may display a preview of these duplicate data records in graphical user interface 400 as illustrated in FIG. 4A.

Graphical user interface 400 may include a single match group ("Match Group 1") consisting of data records 225, 235, and 245. Data records 225 and 235 may match because these data records have the same value in the person data field ("Joseph Ward") and the address data field ("321 Larkin St.") as required by the selected rules. While data record 245 does not satisfy the selected match theme and rules, this data record may be included in the match group given its high degree of similarity with data records 225 and 235. For example, the value "Joe Ward" in data record 245 may be a defined nickname for the value "Joseph Ward" in data records 225 and 235. Moreover, the data record matching application may determine that data records 235 and 245 represent the same individual because both data records have the same phone number. In order to draw the attention of the data steward to this possible match, the data record matching application may tag the match group with review indicator 420 to indicate that manual review may be needed.

In some implementations, the review indicator may be attached to the data record of interest (e.g., data record 245) instead of the match group, or to both the match group and the data record. In some implementations, graphical user interface 400 may display a message indicating why the match group and/or data record was tagged when the data steward hovers or mouses over review indicator 420. The data record matching application may automatically insert review indicators to encourage the data steward to ensure that the match results are as expected. Review indicators may be inserted to notify the data steward of near matches, suspect matches, and conflicting matches.

Two or more data records in a match group may be a near match if the data records do not meet the minimum similarity threshold criteria requirements (e.g., do not satisfy the selected match theme and rules) but are close to satisfying these requirements by a small predetermined margin. For example, two phone numbers may match if the sequence of digits in both phone numbers is the same. Phone numbers 866-325-8165 and 866-325-8156 may not match because the last two digits in these phone numbers are transposed. Notwithstanding this transposition, the data record matching application may flag these phone numbers or the match group for further review by the data steward.

Two or more data records in a match group may be a suspect match if the data records meet the minimum similarity threshold criteria requirements (e.g., satisfy the selected match theme and rules) only by a small predetermined margin, or if the data records possess specific nuances that are acceptable as a match but require further review by the data steward. For example, the data record matching application may determine that the names "John Adams" and "J. Adams" meet the minimum similarity threshold criteria requirements for names because it may be best practice to allow first names to match initials. However, the data record matching application may flag these data records or the match group for further review by the data steward.

Three or more data records may be a conflicting match if subcombinations of the data records form matches, but the data records as a whole do not. For example, with regard to table 200, data records 230, 240, and 250 may be a conflicting match if matching values are required from at least two data types. Data records 230 and 240 may match because these data records have the same values in the person and address fields. Data records 240 and 250 may match because these data records have the same values in the person and phone fields. However, aside from the same "John Smith" value in the person field, data records 230 and 250 have no other matching data values. Consequently, while data record subcombinations 230-240 and 240-250 may match, the records as a whole do not because data records 230 and 250 only have matching values from a single data type.

Returning to FIG. 4A, the data record matching application may attach change indicators 415 to data records 225, 235, and 245 to indicate a change to the match group. When the data steward hovers or mouses over change indicator icon 415, the data record matching application may display a floating window or tooltip that indicates that that these data records are new additions to the match group. In some implementations, the floating window or tooltip may also indicate the previous location of these data records (e.g., if these records were transferred from a different match group or previously unmatched). In some implementations, graphical user interface 400 may include controls that allow the data steward to jump between the data record's current location and previous location.

If the data steward is satisfied with the preview of the duplicate data records, he/she may finalize these results by selecting apply button 405. If, however, the data steward is not satisfied with these results, he/she can select cancel button 410. This latter scenario may apply, for example, if the data steward determines that data record 245 was incorrectly added to the match group 1. In order to remove data record 245 from the match group and to prevent these additions from recurring, the data steward may adjust the strictness of the "Person" match rule.

The data record matching application provides a variety of tools for adjusting match rule strictness. For example, the data steward may use slider 430 illustrated in FIG. 4B to loosen or tighten the strictness requirement for the "Person" match rule by sliding pointer 435 left or right, respectively. If, for example, pointer 435 is moved to the left (i.e., looser), then the data record matching application may automatically adjust different match options related to the "Person" match rule so that matching is less strict. These match options may affect the likelihood of finding a match and may pertain, for example, to capitalization, spacing, and the like. Loosening the strictness for the "Person" match rule may return more matches. Similarly, if pointer 435 is moved to the right (i.e., tighter), then the data record matching application may automatically adjust the related match options so that matching is more stringent and less matches are returned. By consolidating these option adjustments into simple slider movements, the data steward may easily adjust the strictness of the matching process without having to know any of the details of the matching options. Although the implementation of FIG. 4B illustrates a single slider 430, the data record matching application may add an additional slider for each selected rule.

Continuing with the example of FIG. 4A, if the data steward wants to prevent "Joe Ward" in data record 245 from being matched to "Joseph Ward" in data records 225 and 235, he/she can tighten the strictness requirement for the "Person" rule by moving slider 435 from the initial default position to the right as illustrated in FIG. 4B. Doing so can remove data record 245 from match group 1 as indicated by the lined through text in graphical user interface 440 of FIG. 4C. In order to alert the data steward of this change, the data record matching application may tag data record 245 with change indicator icon 445. When the data steward hovers or mouses over change indicator 445, a floating window or tooltip may be displayed indicating that data record 245 was removed. In some implementations, the floating window or tooltip may also indicate the new location of the removed data record or that the removed data record now fails to match any other data records. In some implementations, graphical user interface 400 may include controls that allow the data steward to jump between the data record's former location and new location.

Advanced matching options may also be used to adjust the matching process. FIG. 4D illustrates the use of an address slider 450 in conjunction with advanced address matching options 455. The data steward may use the former in a manner similar to person slider 430. The data record matching application may propose the latter based on the data types in the data records to further customize the matching of address values. For example, if the data steward selects address matching option 457, then the data record matching application may match address values such as "100 Main St." to address values such as "100 Main St., Apt. X." Selecting these options may increase the flexibility of the matching process which, in turn, may return more or less matches. Different matching options may be proposed for different data types. For example, with regard to the country data type, the data record matching application may propose matching "US" with "USA," "United States," and "United States of America."

FIG. 4E illustrates a graphical user interface 460 that includes a new match group ("Match Group 2") that is formed based on the selection of the address matching options illustrated in FIG. 4D. Match group 2 may include data records 210 and 220. These data records are duplicates because both records have the same values in the "Person" data field and the "Address" data field (by virtue of selection option 457). The data record matching application may tag these data records with a change indicator 465. When the data steward hovers or mouses over change indicator icon 465, the data record matching application may display a floating window or tooltip to indicate that these data records are new additions to the match group similar to change indicator 415.

In some implementations, the data record matching application may display one or more statistics related to various characteristics of the duplicate data records. These statistics may include, for example, the number of match groups that are formed by a matching process, the number of changes to a match group after the matching process, a list of changes to the match groups based on the matching process, and the like. In some implementations, the data record matching application may display these statistics whenever an adjustment is made to the match process but before a preview of the match results is shown. As disclosed above, these adjustments may include a change in the selected match theme or match rules, an adjustment in slider pointer position, the selection of advanced matching options, and the like. The data steward may use these statistics to assess the magnitude of these adjustments. For example, if the number of match groups drastically drops from 100 to 5 after the data steward moves the pointer in address slider 450 to the right (i.e., by tightening the strictness of the address rule), then the data steward may determine that he/she moved the pointer too far. The data steward may then reject or undo this change without previewing the match results.

Figure 5:
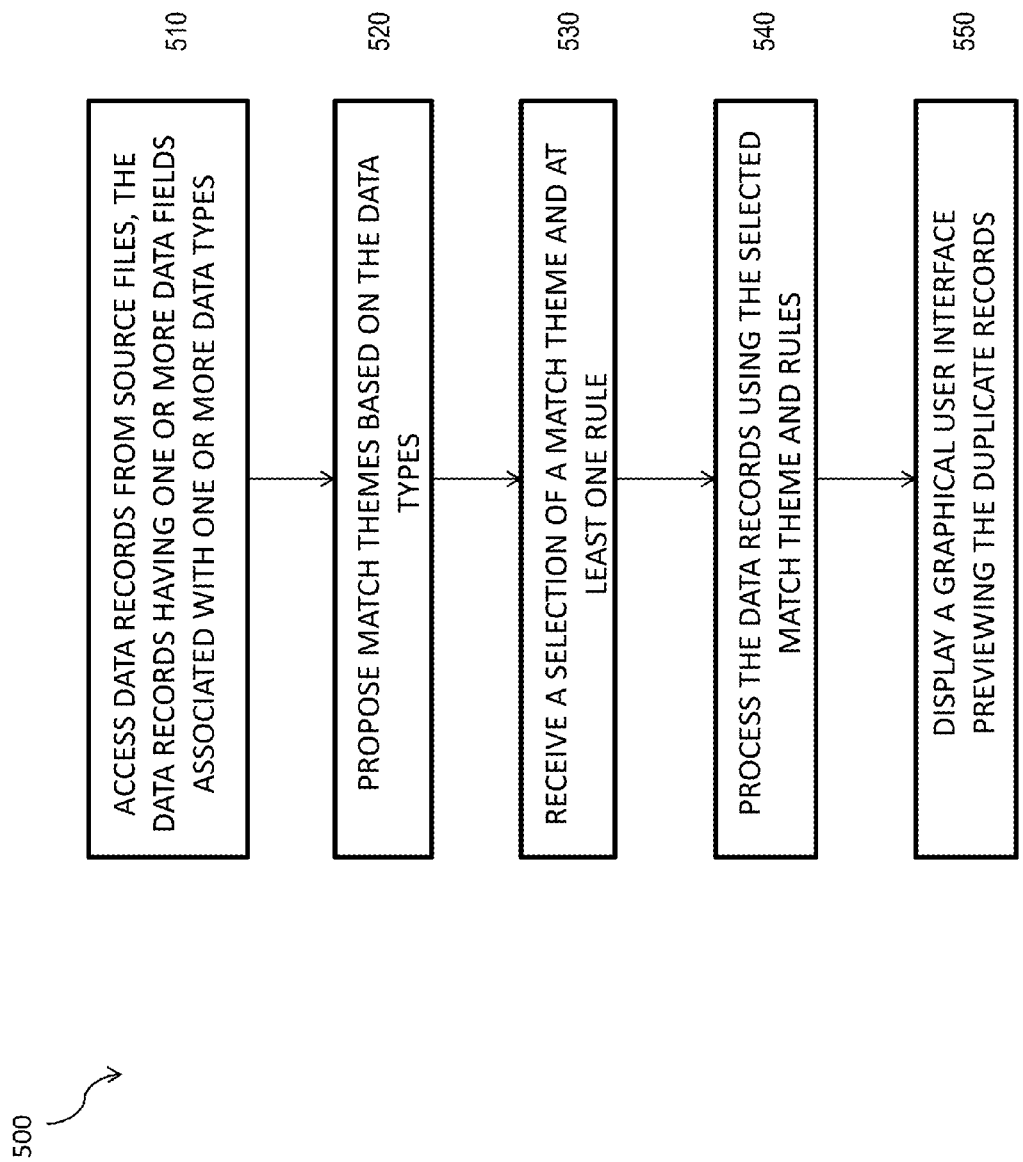
FIG. 5 illustrates a process for displaying a preview of duplicate data records, in accordance with some example implementations.

FIG. 5 illustrates a process 500 for displaying a preview of duplicate data records.

At 510, the data record matching application may access data records from one or more source files. The data records may have one or more data fields that are associated with one or more data types. Table 200, for example, illustrates exemplary data records 210-265. Each data record has a data field that may contain a value for a person's name, firm, ID, country, address, city, region, postal code, e-mail address, and phone number.

At 520, the data record matching application may propose one or more match themes based on the data types in the data records. For example, if the data records contain company information for various firms, then the data record matching application may propose a "Corporate" match theme. As illustrated in graphical user interface 300, each match theme may have one or more rules for identifying duplicate data records.

At 530, the data record matching application may receive a selection of a match theme and at least one rule. In the implementation of FIGS. 3A and 3B, for example, a data steward may select a match theme from drop-down box 305 and one or more match rules 310A, 310B, and 310C by checking the desired box.

At 540, the data record matching application may process the data records using the match theme and rules selected at 530. In some implementations, the data steward may adjust this processing by tightening or loosening the strictness of various match rules. In some implementations, the data steward may use slider 430 or advanced matching options 455 to affect the manner in which matches are found.

At 550, the data record matching application may display a graphical user interface for previewing the duplicate data records. This graphical user interface may correspond to any of interfaces 400, 440, and 460. In some implementations, the graphical user interface may include change indicators to denote changes to data records in a match group. In some implementations, the graphical user interface may also include review indicators to prompt the data steward to manually review suspect matches, near matches, and conflicting matches. The data steward may finalize the preview of the match results by selecting apply button 405 or undo the match results by selecting cancel button 410.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

What is claimed is:

1. A method comprising:

accessing, by at least one processor, one or more data records from one or more source files, the one or more data records having one or more data fields associated with one or more data types;

determining, based on the one or more data types of the one or more data records, one or more match themes;

generating, by the at least one processor, a graphical user interface for presentation at a display, the graphical user interface being configured to enable selection of the determined one or more match themes;

receiving, by the at least one processor, a selection of a match theme being presented via the graphical user interface, wherein the generated graphical user interface includes, in response to the received selection of the match theme, one or more match rules for the selected match theme, the one or more match rules enabling identification of one or more duplicate data records from the accessed one or more data records;

receiving, by the at least one processor, a selection of at least one match rule being presented in response to the received selection of the match theme and presented via the graphical user interface;

processing, by the at least one processor, the one or more data records using the selected match theme and the selected at least one match rule to identify the one or more duplicate data records; and displaying a preview graphical user interface that provides a preview of the one or more duplicate data records, the one or more duplicate data records organized into a match group, wherein the match group includes matching records selected based on the match theme and the selected at least one match rule, the match group including the one or more duplicate data records further including a near matching record representing a possible duplicate record, wherein the one or more duplicate data records including the near matching record being previewed is adjusted in response to a selection at a graphical slider, wherein the adjustment of the graphical slider adjusts a match strictness of the selected at least one match rule such that moving the graphical slider in a first direction tightens one or more options associated with matching in accordance with the selected at least one match rule and removes at least the near matching record from the match group being displayed via the preview graphical user interface, wherein moving the graphical slider in a second, opposite direction loosens the one or more options associated with matching in accordance with the selected at least one match rule and adds at least the near matching record from the match group being displayed via the preview graphical user interface, and wherein the preview graphical user interface further displays a message identifying a status of a removed duplicate data record, the status comprising one or more of a transfer of the removed duplicate data record to a new match group and/or a failure of the removed duplicate record to match with any of the one or more match groups.

2. The method of claim 1, wherein the preview graphical user interface further displays one or more change indicators identifying a change to one or more duplicate data records in the at least one match group, and wherein the change to the one or more duplicate data records comprise one or more of a removal of a duplicate data record from the at least one match group and an addition of a new duplicate data record to the at least one match group.

3. The method of claim 2, wherein the preview graphical user interface further displays the message to identify the change in a floating window in response to hovering over the change indicator.

4. The method of claim 1 further comprising displaying one or more statistics relating to the one or more data records, the one or more statistics including one or more of the following:

a first quantity representing a number of the match groups after the processing, a second quantity representing a number of changes to the match groups after the processing, and a list of changes to the match groups based on the processing.

5. The method of claim 1, wherein the preview graphical user interface further displays a list of one or more advanced matching options defining additional match conditions, the one or more advanced matching options based on the one or more data.

6. The method of claim 1, wherein the match groups comprise two or more data records satisfying one or more of the following conditions:

the two or more data records have identical data values in each of the data types associated with the selected match theme and the at least one rule;

the two or more data records are a near match;

the two or more data records are a suspect match; and the two more data records are a conflicting match.

7. The method of claim 6, wherein the preview graphical user interface further displays one or more review indicators associated with the one or more match groups, the one or more review indicators flagging the near match, the suspect match, or the conflicting match.

8. A non-transitory computer-readable medium containing instructions to configure a processor to perform operations comprising:

accessing, by at least one processor, one or more data records from one or more source files, the one or more data records having one or more data fields associated with one or more data types;

determining, based on the one or more data types of the one or more data records, one or more match themes;

generating, by the at least one processor, a graphical user interface for presentation at a display, the graphical user interface being configured to enable selection of the determined one or more match themes;

receiving, by the at least one processor, a selection of a match theme being presented via the graphical user interface, wherein the generated graphical user interface includes, in response to the received selection of the match theme, one or more match rules for the selected match theme, the one or more match rules enabling identification of one or more duplicate data records from the accessed one or more data records;

receiving, by the at least one processor, a selection of at least one match rule being presented in response to the received selection of the match theme and presented via the graphical user interface;

processing, by the at least one processor, the one or more data records using the selected match theme and the selected at least one match rule to identify the one or more duplicate data records; and displaying a preview graphical user interface that provides a preview of the one or more duplicate data records, the one or more duplicate data records organized into a match group, wherein the match group includes matching records selected based on the match theme and the selected at least one match rule, the match group including the one or more duplicate data records further including a near matching record representing a possible duplicate record, wherein the one or more duplicate data records including the near matching record being previewed is adjusted in response to a selection at a graphical slider, wherein the adjustment of the graphical slider adjusts a match strictness of the selected at least one match rule such that moving the graphical slider in a first direction tightens one or more options associated with matching in accordance with the selected at least one match rule and removes at least the near matching record from the match group being displayed via the preview graphical user interface, wherein moving the graphical slider in a second, opposite direction loosens the one or more options associated with matching in accordance with the selected at least one match rule and adds at least the near matching record from the match group being displayed via the preview graphical user interface, and wherein the preview graphical user interface further displays a message identifying a status of a removed duplicate data record, the status comprising one or more of a transfer of the removed duplicate data record to a new match group and/or a failure of the removed duplicate record to match with any of the one or more match groups.

9. The non-transitory computer-readable medium of claim 8, wherein the preview graphical user interface further displays one or more change indicators identifying a change to one or more duplicate data records in the at least one match group, and wherein the change to the one or more duplicate data records comprise one or more of a removal of a duplicate data record from the at least one match group and an addition of a new duplicate data record to the at least one match group.

10. The non-transitory computer-readable medium of claim 9, wherein the preview graphical user interface further displays the message to identify the change in a floating window in response to hovering over the change indicator.

11. The non-transitory computer-readable medium of claim 8 further comprising: displaying a list of one or more advanced matching options defining additional match conditions, the one or more advanced matching options based on the one or more data types.

12. The non-transitory computer-readable medium of claim 8, wherein the match groups comprise two or more data records satisfying one or more of the following conditions:

the two or more data records have identical data values in each of the data types associated with the selected match theme and the at least one rule;

the two or more data records are a near match;

the two or more data records are a suspect match; and the two more data records are a conflicting match.

13. A system comprising:

at least one processor; and at least one memory, wherein the at least one processor and the at least one memory are configured to perform operations comprising:

accessing, by at least one processor, one or more data records from one or more source files, the one or more data records having one or more data fields associated with one or more data types;

determining, based on the one or more data types of the one or more data records, one or more match themes;

generating, by the at least one processor, a graphical user interface for presentation at a display, the graphical user interface being configured to enable selection of the determined one or more match themes;

receiving, by the at least one processor, a selection of a match theme being presented via the graphical user interface, wherein the generated graphical user interface includes, in response to the received selection of the match theme, one or more match rules for the selected match theme, the one or more match rules enabling identification of one or more duplicate data records from the accessed one or more data records;

receiving, by the at least one processor, a selection of at least one match rule being presented in response to the received selection of the match theme and presented via the graphical user interface;

processing, by the at least one processor, the one or more data records using the selected match theme and the selected at least one match rule to identify the one or more duplicate data records; and displaying a preview graphical user interface that provides a preview of the one or more duplicate data records, the one or more duplicate data records organized into a match group, wherein the match group includes matching records selected based on the match theme and the selected at least one match rule, the match group including the one or more duplicate data records further including a near matching record representing a possible duplicate record, wherein the one or more duplicate data records including the near matching record being previewed is adjusted in response to a selection at a graphical slider, wherein the adjustment of the graphical slider adjusts a match strictness of the selected at least one match rule such that moving the graphical slider in a first direction tightens one or more options associated with matching in accordance with the selected at least one match rule and removes at least the near matching record from the match group being displayed via the preview graphical user interface, wherein moving the graphical slider in a second, opposite direction loosens the one or more options associated with matching in accordance with the selected at least one match rule and adds at least the near matching record from the match group being displayed via the preview graphical user interface, and wherein the preview graphical user interface further displays a message identifying a status of a removed duplicate data record, the status comprising one or more of a transfer of the removed duplicate data record to a new match group and/or a failure of the removed duplicate record to match with any of the one or more match groups.

14. The system of claim 13, wherein the preview graphical user interface further displays one or more change indicators identifying a change to one or more duplicate data records in the at least one match group wherein the change to the one or more duplicate data records comprise one or more of a removal of a duplicate data record from the at least one match group and an addition of a new duplicate data record to the at least one match group.

15. The system of claim 14, wherein the preview graphical user interface further displays message identifying the change in a floating window in response to hovering over the change indicator.

16. The system of claim 13 further comprising: displaying a list of one or more advanced matching options defining additional match conditions, the one or more advanced matching options based on the one or more data types.

17. The system of claim 13, wherein the match groups comprise two or more data records satisfying one or more of the following conditions:

the two or more data records have identical data values in each of the data types associated with the selected match theme and the at least one rule;

the two or more data records are a near match;

the two or more data records are a suspect match; and the two more data records are a conflicting match.

18. A method comprising:

accessing, by at least one processor, one or more data records from one or more source files, the one or more data records having one or more data fields associated with one or more data types;

determining, based on the one or more data types of the one or more data records, one or more match themes;

generating, by the at least one processor, a graphical user interface for presentation at a display, the graphical user interface being configured to enable selection of the determined one or more match themes;

receiving, by the at least one processor, a selection of a match theme being presented via the graphical user interface, wherein the generated graphical user interface includes, in response to the received selection of the match theme, one or more match rules for the selected match theme, the one or more match rules enabling identification of one or more duplicate data records from the accessed one or more data records;

receiving, by the at least one processor, a selection of at least one match rule being presented in response to the received selection of the match theme and presented via the graphical user interface;

processing, by the at least one processor, the one or more data records using the selected match theme and the selected at least one match rule to identify the one or more duplicate data records; and displaying a preview graphical user interface that provides a preview of the one or more duplicate data records, the one or more duplicate data records organized into a match group, wherein the match group includes matching records selected based on the match theme and the selected at least one match rule, the match group including the one or more duplicate data records further including a near matching record representing a possible duplicate record, wherein the one or more duplicate data records including the near matching record being previewed is adjusted in response to a selection at a graphical slider, wherein the adjustment of the graphical slider adjusts a match strictness of the selected at least one match rule such that moving the graphical slider adds or removes at least the near matching record from the match group being displayed via the preview graphical user interface, and wherein the preview graphical user interface further displays a message identifying a status of a removed duplicate data record, the status comprising one or more of a transfer of the removed duplicate data record to a new match group and/or a failure of the removed duplicate record to match with any of the one or more match groups.

* * * * *